United States Patent
Kumar et al.

(10) Patent No.: US 10,108,482 B2
(45) Date of Patent: Oct. 23, 2018

(54) SECURITY PATCH TOOL

(71) Applicant: BANK OF AMERICA CORPORATION, Charlotte, NC (US)

(72) Inventors: Vivek Kumar, New Delhi (IN); Hitendra Kumar, Ghaziabad (IN); Amit Kumar, Gurgaon (IN); Scott M. Bolduc, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 116 days.

(21) Appl. No.: 15/187,026

(22) Filed: Jun. 20, 2016

(65) Prior Publication Data

US 2017/0364406 A1 Dec. 21, 2017

(51) Int. Cl.
*G06F 11/07* (2006.01)
*G06F 8/65* (2018.01)

(52) U.S. Cl.
CPC .......... *G06F 11/0793* (2013.01); *G06F 8/65* (2013.01); *G06F 11/079* (2013.01); *G06F 11/0709* (2013.01); *G06F 11/0751* (2013.01); *G06F 11/0772* (2013.01)

(58) Field of Classification Search
CPC .......... G06F 11/3051; G06F 11/0793; G06F 11/2028; G06F 11/3006
See application file for complete search history.

(56) References Cited

U.S. PATENT DOCUMENTS

| | | | | |
|---|---|---|---|---|
| 7,908,600 | B2* | 3/2011 | Nguyen | G06F 11/1433 717/168 |
| 7,937,697 | B2 | 5/2011 | Alberti | |
| 8,078,922 | B2 | 12/2011 | Yordanov | |
| 8,930,395 | B2 | 1/2015 | Sharma | |
| 9,176,728 | B1 | 11/2015 | Dixit | |
| 2006/0117310 | A1* | 6/2006 | Daniels | G06F 8/68 717/168 |
| 2006/0250981 | A1* | 11/2006 | Li | H04L 41/0806 370/254 |
| 2007/0113225 | A1* | 5/2007 | Felts | G06F 8/65 717/172 |
| 2008/0083030 | A1* | 4/2008 | Durham | G06F 8/67 726/22 |
| 2011/0138374 | A1* | 6/2011 | Pal | G06F 8/67 717/169 |
| 2017/0161030 | A1* | 6/2017 | Wood | G06F 8/36 |

\* cited by examiner

*Primary Examiner* — Jigar Patel
(74) *Attorney, Agent, or Firm* — Baker Botts L.L.P.

(57) ABSTRACT

A security patch tool includes a retrieval engine, a parser, and a reporting engine. The retrieval engine retrieves, from a first database, a log indicating a plurality of patches that have been applied and whether each patch of the plurality of patches was applied successfully. The parser determines, based on the log, a second plurality of patches of the plurality of patches that were not applied successfully and determines, based on the log, an error code for each patch of the second plurality of patches. The retrieval engine further retrieves, from a second database, a remedy for each error code for each patch of the second plurality of patches. The reporting engine generates a report indicating the plurality of patches, the error code for each patch of the second plurality of patches, and the remedy for each error code for each path of the second plurality of patches.

18 Claims, 3 Drawing Sheets

SECURITY PATCH TOOL

TECHNICAL FIELD

This disclosure relates generally to applying patches to servers.

BACKGROUND

Applications and servers undergo maintenance to improve and/or maintain the operation of the applications and/or servers. During maintenance, patches such as security updates may be applied to the applications and/or servers. In some instances, these patches may apply unsuccessfully.

SUMMARY OF THE DISCLOSURE

According to an embodiment, a security patch tool includes a retrieval engine, a parser, and a reporting engine. The retrieval engine retrieves, from a first database, a log indicating a plurality of patches that have been applied and whether each patch of the plurality of patches was applied successfully. The parser determines, based on the log, a second plurality of patches of the plurality of patches that were not applied successfully and determines, based on the log, an error code for each patch of the second plurality of patches. The retrieval engine further retrieves, from a second database, a remedy for each error code for each patch of the second plurality of patches. The reporting engine generates a report indicating the plurality of patches, the error code for each patch of the second plurality of patches, and the remedy for each error code for each path of the second plurality of patches.

According to another embodiment, a method includes retrieving, from a first database, a log indicating a plurality of patches that have been applied and whether each patch of the plurality of patches was applied successfully and determining, based on the log, a second plurality of patches of the plurality of patches that were not applied successfully. The method also includes determining, based on the log, an error code for each patch of the second plurality of patches and retrieving, from a second database, a remedy for each error code for each patch of the second plurality of patches. The method further includes generating a report indicating the plurality of patches, the error code for each patch of the second plurality of patches, and the remedy for each error code for each path of the second plurality of patches.

According to yet another embodiment, a system includes a parser and a reporting engine. The parser determines, based on a retrieved log indicating a plurality of patches that have been applied and whether each patch of the plurality of patches was applied successfully, a second plurality of patches of the plurality of patches that were not applied successfully and determines, based on the log, an error code for each patch of the second plurality of patches. The reporting engine generates a report indicating the plurality of patches, the error code for each patch of the second plurality of patches, and a retrieved remedy for each error code for each path of the second plurality of patches.

Certain embodiments provide one or more technical advantages. For example, an embodiment improves the operation of a server by determining patches that were applied unsuccessfully to the server. As another example, an embodiment improves the operation of a server by determining error codes and remedies for patches that were applied unsuccessfully. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
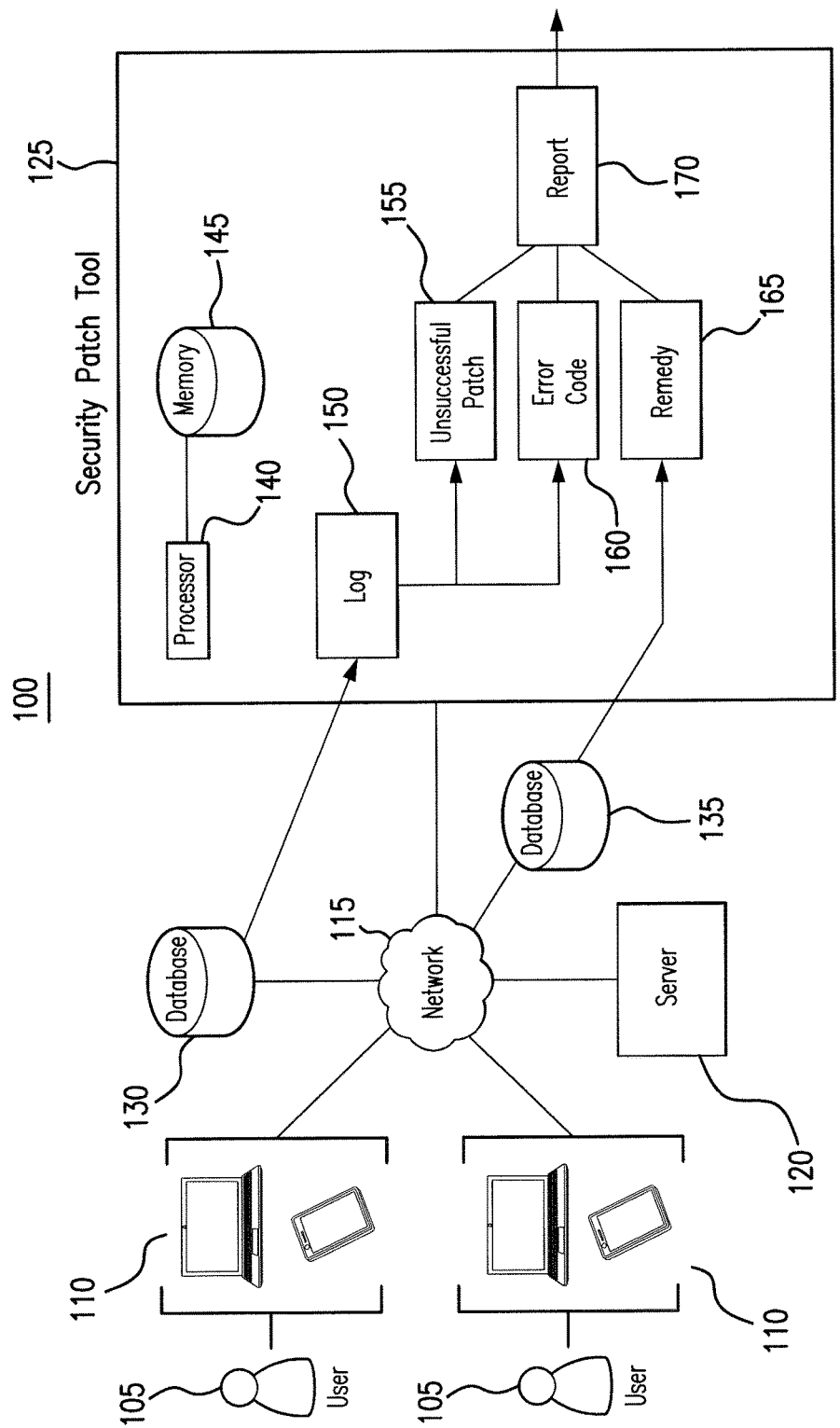
FIG. 1 illustrates a system for resolving unsuccessful patches.
Figure 2:
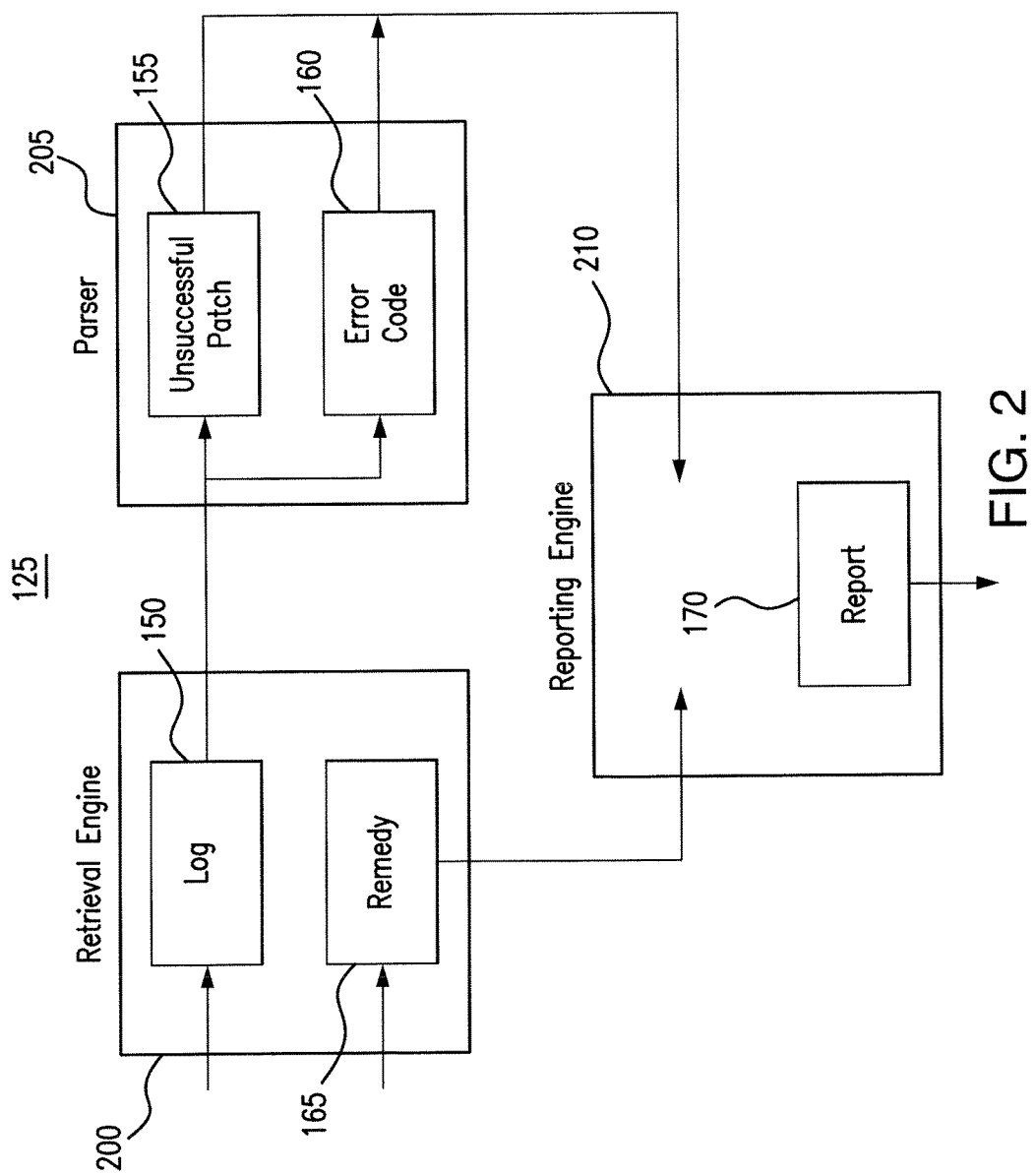
FIG. 2 illustrates the security patch tool of the system of FIG. 1.
Figure 3:
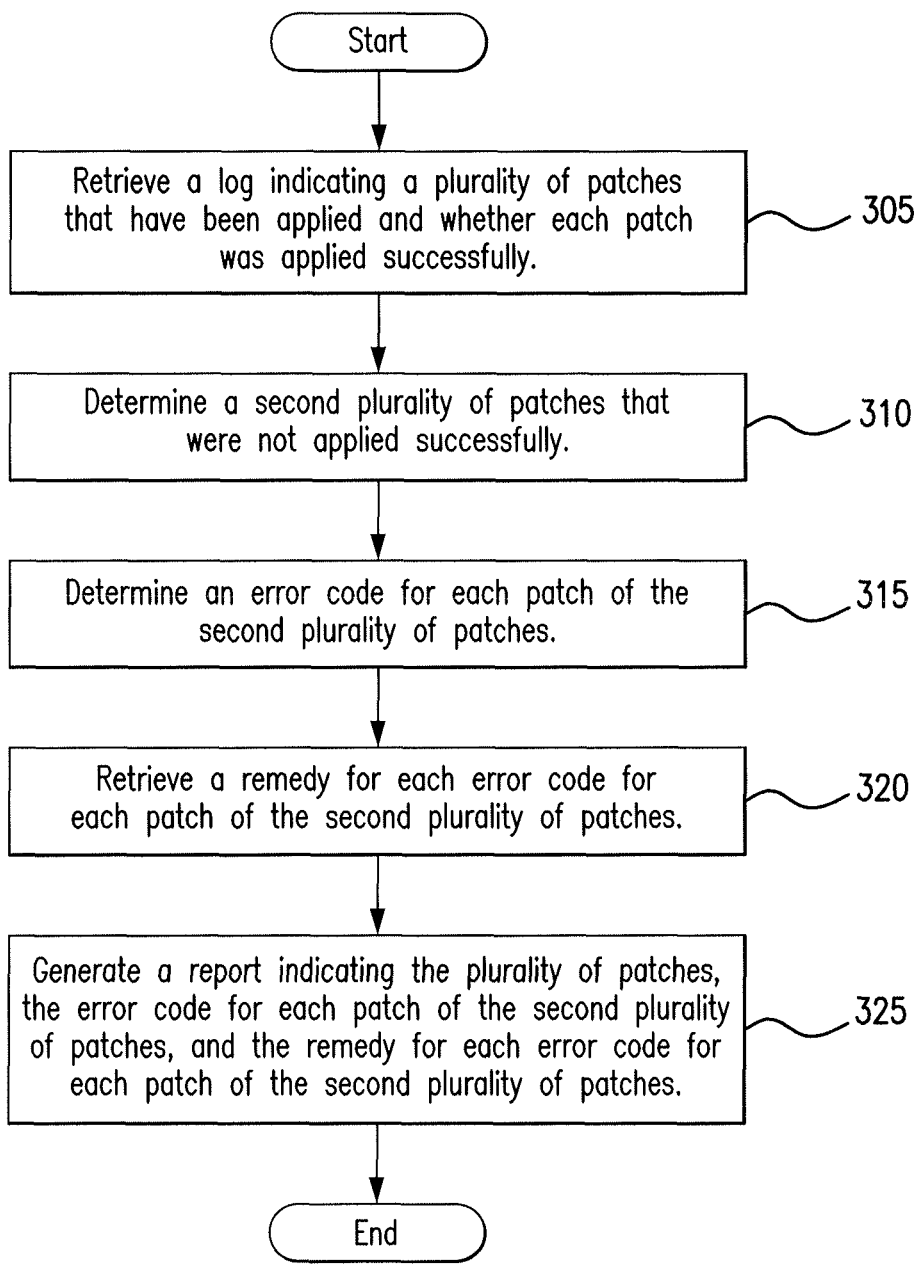
FIG. 3 is a flowchart illustrating a method for resolving unsuccessful patches using the system of FIG. 1.

Embodiments of the present disclosure and its advantages are best understood by referring to FIGS. 1 through 3 of the drawings, like numerals being used for like and corresponding parts of the various drawings.

Applications and servers undergo maintenance to improve and/or maintain the operation of the applications and/or servers. During maintenance, patches such as security updates may be applied to the applications and/or servers. The security updates help protect the applications and/or servers from malicious activity that damages the applications and/or servers. Furthermore, the security updates improve the operation of the applications and/or servers so that users (and devices of the users) of the applications and/or servers are not harmed by using the applications and/or servers. As a result, applying patches and updates to applications and/or servers improves the physical operation of the applications and/or servers.

In some instances, patches and/or updates may apply unsuccessfully to applications and/or servers. For example, the patching or update process may encounter an error that prevents it from completing. In these instances, the patching or update process may generate an error code that corresponds with the error encountered by the patching or update process.

As computer systems and networks become more distributed to include more hardware and/or systems, the patching and/or update process becomes more challenging. For example, as the number of systems and/or hardware increases, the number of patches and/or updates that need to be applied also increases. As the number of patches and/or updates increases, the number of unsuccessful applications of patches and/or updates also increases. It becomes more challenging to determine which patches and/or updates did not apply successfully and to remedy those unsuccessful applications. In many instances, patches and/or updates that were not applied successfully are not detected, which leaves the servers and/or applications vulnerable.

This disclosure contemplates a security patch tool that determines and tracks which patches and/or updates did not apply successfully. The security patch tool also determines any error codes that correspond to the unsuccessful applications and any remedies to fix the errors corresponding to those error codes. The security patch tool further reports the unsuccessful patches, error codes, and remedies so that remedial action can be taken. In this manner, the security patch tool improves the operation of a server by determining patches that were applied unsuccessfully to the server in certain embodiments. Furthermore, the security patch tool improves the operation of a server by determining error codes and remedies for patches that were applied unsuccessfully to the server in an embodiment. The security patch tool will be described using FIGS. 1 through 3. FIG. 1 will describe the tool generally and FIGS. 2 and 3 will describe the tool in more detail.

FIG. 1 illustrates a system 100 for resolving unsuccessful patches. As illustrated in FIG. 1, system 100 includes users 105, devices 110, network 115, server 120, security patch tool 125, database 130, and database 135. In particular embodiments, system 100 improves the operation of server 120 by determining patches that failed to apply successfully to server 120 and by determining error codes and remedies for the unsuccessfully applied patch.

Devices 110 may be any device configured to communicate with other components of system 100. For example, devices 110 may initiate the patch process for server 120. Additionally, devices 110 may communicate with databases 130 and 135. Furthermore, devices 110 may send commands to security patch tool 125. This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Server 120 may include any combination of hardware and/or software to perform tasks and/or services requested by other components of system 100. For example, server 120 may include a processor and a memory that executes software installed on server 120. The software may include one or more applications. During a maintenance period, patches and/or updates may be applied to server 120 and/or one or more applications executed by server 120. For example, security updates may be applied to server 120 and/or an application of server 120. These patches and/or updates improve the operation of server 120 by updating security protocols for server 120. In some instances, these patches and/or updates may be applied unsuccessfully because of an error during the application process. If numerous patches are being applied to server 120 at one time and several of these patches fail to apply successfully, then it may become difficult to determine which of the patches applied unsuccessfully, the reason these patches applied unsuccessfully, and the remedy. As a result, the operation of server 120 and/or applications suffer when numerous patches fail to apply successfully.

Security patch tool 125 improves the patch application process in particular embodiments. As illustrated in FIG. 1, security patch tool 125 includes a processor 140 and a memory 145. This disclosure contemplates processor 140 and memory 145 being configured to perform any of the functions of security patch tool 125 disclosed herein.

Processor 140 is any electronic circuitry, including, but not limited to microprocessors, application specific integrated circuits (ASIC), application specific instruction set processor (ASIP), and/or state machines, that communicatively couples to memory 145 and controls the operation of security patch tool 125. Processor 140 may be 8-bit, 16-bit, 32-bit, 64-bit or of any other suitable architecture. Processor 140 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 140 may include other hardware and software that operates to control and process information. Processor 140 executes software stored on memory to perform any of the functions described herein. Processor 140 controls the operation and administration of job hold tool 120 by processing information received from network 115, device(s) 110, and memory 145. Processor 140 may be a programmable logic device, a microcontroller, a microprocessor, any suitable processing device, or any suitable combination of the preceding. Processor 140 is not limited to a single processing device and may encompass multiple processing devices.

Memory 145 may store, either permanently or temporarily, data, operational software, or other information for processor 140. Memory 145 may include any one or a combination of volatile or non-volatile local or remote devices suitable for storing information. For example, memory 145 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 145, a disk, a CD, or a flash drive. In particular embodiments, the software may include an application executable by processor 140 to perform one or more of the functions described herein.

Security patch tool 125 retrieves a log 150 from database 130. Log 150 may be maintained during the patch application process. Log 150 may include any information pertaining to the patch application process. For example, log 150 may indicate the patches that were applied both successfully and unsuccessfully to server 120. As another example, log 150 may indicate a time when each patch application process began. Log 150 may also indicate one or more servers 120, a location for each server, and an operating system for each server on which the patch application process took place. In some embodiments, database 130 may store a separate log that indicates one or more patches that are applied periodically. For example, the separate log may indicate one or more patches that have been applied at least once every 15 minutes. In some embodiments, this information is stored together with other information in log 150.

Based on the information in log 150, security patch tool 125 may determine one or more unsuccessful patches 155.

Each unsuccessful patch 155 is a patch that did not apply successfully to server 120 and/or an application of server 120 during the patch application process. Furthermore, based on information in log 150, security patch tool 125 may determine an error code 160 for each unsuccessful patch 155. Error code 160 corresponds to an error that resulted in the unsuccessful patch 155 applying unsuccessfully to server 120 and/or an application of server 120.

Security patch tool 125 retrieves a remedy 165 from database 135 based on error code 160. Database 135 may store an index of remedies for particular error codes. Security patch tool 125 may determine error code 160 and retrieve remedy 165 that fixes the error corresponding to error code 160.

Security patch tool 125 generates report 170 using unsuccessful patch 155, error code 160, and remedy 165. Report 170 may include a list of patches that did not apply successfully to server 120, any error codes for errors that caused these patches to apply unsuccessfully, and any remedies to fix the errors corresponding to those error codes. Security patch tool 125 may then communicate report 170 to other components of system 100, such as devices 110, so that patches that were previously applied unsuccessfully can be applied successfully to server 120. As a result, the operation of server 120 is improved.

FIG. 2 illustrates the security patch tool 125 of the system 100 of FIG. 1. As illustrated in FIG. 2, security patch tool 125 includes a retrieval engine 200, a parser 205 and a reporting engine 210. In particular embodiments, security patch tool 125 improves the operation of a server and/or application by determining an error code corresponding to an unsuccessful patch application and a remedy for the error corresponding to that error code.

Retrieval engine 200 retrieves information from other elements of system 100, such as database 130 and database 135. For example, retrieval engine 200 retrieves log 150 from database 130 and remedy 165 from database 135. In particular embodiments, retrieval engine 200 retrieves log 150 and/or remedy 165 in response to a received request from a user 105 and/or a device 110. The request may include a command to generate a report indicating patches that were applied unsuccessfully. An example algorithm for retrieval engine 200 is as follows: receive a command to identify patches that were applied unsuccessfully; open a connection to a first database; retrieve a log from the first database; receive an error code; open a connection to a second database; retrieve a remedy corresponding to the error code from the second database; and communicate the retrieved remedy to reporting engine 210.

Parser 205 receives log 150 from retrieval engine 200. Based on log 150, parser 205 identifies one or more unsuccessful patches 155. Each unsuccessful patch 155 is a patch that was applied unsuccessfully to server 120. In certain instances, a patch may have been applied unsuccessfully because an error occurred during the patch application process. The errors may be, for example, an application or server was performing a task during the patch application process, the patch itself contained improper code, and the server ran out of system resources during the patch application process. Each of these errors may be assigned an error code that identifies the error. Parser 205 may determine one or more error codes 160 for the one or more unsuccessful patches 155 based on information in log 150. Each error code 160 may identify an error that caused each of the one or more unsuccessful patches 155 to be applied unsuccessfully. An example algorithm for parser 205 is as follows: receive log 150 from retrieval engine 200; parse log 150 to identify one or more unsuccessful patches 155; parse log 150 to identify one or more error codes corresponding to the one or more unsuccessful patches 155; and communicate the one or more unsuccessful patches and the one or more error codes 160 to reporting engine 210.

Reporting engine 210 generates a report 170 based on information from retrieval engine 200 and parser 205. For example, reporting engine 210 may use remedy 165, the one or more unsuccessful patches 155, and the one or more error codes 160 to generate report 170. As a result, report 170 may indicate the one or more patches 155 that were not applied successfully, the one or more error codes 160 that identify the errors that caused the one or more unsuccessful patches 155 to be not applied successfully, and one or more remedies 165 for each of the one or more error codes 160. The remedies 165 may provide steps to fix the errors corresponding to the error codes 160. For example, the remedies 165 may include freeing up system resources before applying a patch, closing an application before applying a patch, and/or requesting an updated patch. An example algorithm for reporting engine 210 is as follows: receive one or more remedies 165 from retrieval engine 210; receive one or more unsuccessful patches 155 from parser 205; receive one or more error codes from parser 205; create a report 170; add the one or more received remedies 165, the one or more unsuccessful patches 155, and the one or more error codes 160 to report 170; communicate report 170 to another component of system 100.

In particular embodiments, security patch tool 125 includes a remediation engine that applies the one or more remedies 165 for each of the one or more error codes 160. For example, if a remedy 165 is to close an application then the remediation engine may close the application. An example algorithm for the remediation engine is as follows: receive one or more remedies 165 from retrieval engine 200; determine a process that should be performed based on a received remedy 165; perform the determined process.

In particular embodiments, parser 205 stores in a database a log indicating the one or more unsuccessful patches 155, the one or more error codes 160, and the one or more remedies 165. The log may further store one or more patches that were applied successfully. In this manner, parser 205 may maintain a log of information that security patch tool 125 has received.

In particular embodiments, reporting engine 210 generates report 170 in response to a received request for the results of applying patches to server 120. Reporting engine 210 may receive that request from one or more devices 110 of system 100. In particular embodiments, reporting engine 210 also generates an email message that includes a link to report 170. Reporting engine 210 then communicates that email to one or more users 105 so that the one or more users 105 can access report 170.

FIG. 3 is a flowchart illustrating a method 300 for resolving unsuccessful patches using the system 100 of FIG. 1. In particular embodiments, server patch tool 125 performs method 300. By performing method 300, server patch tool 125 improves the operation of a server and/or application by identifying patches that were applied unsuccessfully and by identifying errors that caused the patches to be applied unsuccessfully and remedies for those errors.

Server patch tool 125 may begin by retrieving a log indicating a plurality of patches that have been applied and whether each patch was applied successfully in step 305. In step 310, server patch tool 125 determines a second plurality of patches that were not applied successfully. Then server patch tool 125 determines an error code for each patch of the second plurality of patches in step 315. Server patch tool 125 then retrieves a remedy for each error code for each patch of the second plurality of patches in step 320. In step 325, server patch tool 125 generates a report indicating the plurality of patches, the error code for each patch of the second plurality of patches, and the remedy for each error code for each patch of the second plurality of patches.

Modifications, additions, or omissions may be made to method 300 depicted in FIG. 3. Method 300 may include more, fewer, or other steps. For example, steps may be performed in parallel or in any suitable order. While discussed as security patch tool 125 performing the steps, any suitable component of system 100, such as device(s) 110 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A security patch tool comprising:
a retrieval engine configured to retrieve, from a first database, a log indicating a plurality of patches that have been applied and whether each patch of the plurality of patches was applied successfully;
a parser configured to:
determine, based on the log, that a first patch and a second path of the plurality of patches were not applied successfully; and
determine, based on the log, a first error code indicating that the first patch did not apply successfully because there were insufficient system resources and a second error code indicating that the second patch did not apply successfully because an application was executing, wherein the retrieval engine is further configured to retrieve, from a second database, a first remedy for the first error code and a second remedy for the second error code;
a reporting engine configured to generate a report indicating the plurality of patches, the error code for each patch of the second plurality of patches, and the remedy for each error code for each path of the second plurality of patches; and
a remediation engine configured to:
free up system resources before re-applying the first patch; and
close the application before re-applying the second patch.

2. The security patch tool of claim 1, wherein the retrieval engine retrieves a log indicating a plurality of patches that have been applied at least once every fifteen minutes.

3. The security patch tool of claim 1, wherein the parser is further configured to store, in a third database, a log indicating the plurality of patches, the error code for each patch of the second plurality of patches, and the remedy for each error code for each path of the second plurality of patches.

4. The security patch tool of claim 1, wherein the reporting engine generates the report in response to a received request for the results of applying the first plurality of patches.

5. The security patch tool of claim 1, wherein the reporting engine is further configured to generate an e-mail message comprising a link to the report.

6. The security patch tool of claim 1, wherein the log further indicates a plurality of servers, a location for each server of the plurality of servers, and an operating system for each server of the plurality of servers.

7. A method comprising:
retrieving, from a first database, a log indicating a plurality of patches that have been applied and whether each patch of the plurality of patches was applied successfully;
determining, based on the log, that a first patch and a second path of the plurality of patches were not applied successfully;
determining, based on the log, a first error code indicating that the first patch did not apply successfully because there were insufficient system resources and a second error code indicating that the second patch did not apply successfully because an application was executing;
retrieving, from a second database, a first remedy for the first error code and a second remedy for the second error code; and
generating a report indicating the plurality of patches, the error code for each patch of the second plurality of patches, and the remedy for each error code for each path of the second plurality of patches;
freeing up system resources before re-applying the first patch; and
closing the application before re-applying the second patch.

8. The method of claim 7, further comprising retrieving a log indicating a plurality of patches that have been applied at least once every fifteen minutes.

9. The method of claim 7, further comprising storing, in a third database, a log indicating the plurality of patches, the error code for each patch of the second plurality of patches, and the remedy for each error code for each path of the second plurality of patches.

10. The method of claim 7, generating the report is in response to a received request for the results of applying the first plurality of patches.

11. The method of claim 7, further comprising generate an e-mail message comprising a link to the report.

12. The method of claim 7, wherein the log further indicates a plurality of servers, a location for each server of the plurality of servers, and an operating system for each server of the plurality of servers.

13. A system comprising:
a first database;
a second database; and
a parser configured to:
determine, based on a log retrieved from the first database, the log indicating a plurality of patches that have been applied and whether each patch of the plurality of patches was applied successfully, that a first patch and a second path of the plurality of patches were not applied successfully; and
determine, based on the log, a first error code indicating that the first patch did not apply successfully because there were insufficient system resources and a second error code indicating that the second patch did not apply successfully because an application was executing, wherein a first remedy for the first error code and a second remedy for the second error code are retrieved from the second database;
a reporting engine configured to generate a report indicating the plurality of patches, the error code for each patch of the second plurality of patches, and a retrieved remedy for each error code for each path of the second plurality of patches; and a remediation engine configured to:
free up system resources before re-applying the first patch ; and
close the application before re-applying the second patch.

14. The system of claim 13, wherein the log further indicates a plurality of patches that have been applied at least once every fifteen minutes.

15. The system of claim 13, wherein the parser is further configured to store, in a third database, a log indicating the plurality of patches, the error code for each patch of the second plurality of patches, and the remedy for each error code for each path of the second plurality of patches.

16. The system of claim 13, wherein the reporting engine generates the report in response to a received request for the results of applying the first plurality of patches.

17. The system of claim 13, wherein the reporting engine is further configured to generate an e-mail message comprising a link to the report.

18. The system of claim 13, wherein the log further indicates a plurality of servers, a location for each server of the plurality of servers, and an operating system for each server of the plurality of servers.

* * * * *